United States Patent [19]

Garrett et al.

[11] Patent Number: 5,507,957
[45] Date of Patent: Apr. 16, 1996

[54] TREATING MATERIALS WITH OZONE

[76] Inventors: Michael E. Garrett, 92 York Road, Woking, Surrey; John R. Coates, 42 Weybourne Road, Farnham, Surrey, both of England

[21] Appl. No.: 40,776

[22] Filed: Mar. 31, 1993

[30] Foreign Application Priority Data

Mar. 31, 1992 [GB] United Kingdom ............... 9207298

[51] Int. Cl.$^6$ .................................................. C02F 1/78
[52] U.S. Cl. ................... 210/760; 34/332; 95/96; 95/130; 95/138
[58] Field of Search ................... 210/760, 192; 422/186.23, 186.07, 186.08, 186.09, 186.12; 423/581; 34/9; 95/130, 138, 96

[56] References Cited

FOREIGN PATENT DOCUMENTS 52-081092  7/1977  Japan.

Primary Examiner—Neil McCarthy

[57] ABSTRACT

A method of treating a material with ozone including the steps of passing oxygen rich gas from a PSA plant 2 through an ozonizer 4 and then passing the ozonized oxygen thus formed directly back to the PSA plant where the ozone is adsorbed in a bed of silica gel contained within a vessel. During the desorption step nitrogen adsorbed in a bed of zeolite also located in the vessel desorbs the ozone from the bed of silica gel and a nitrogen-ozone gas leaves the PSA plant via a line in the feed end. The material is treated with the nitrogen-ozone gas.

5 Claims, 1 Drawing Sheet

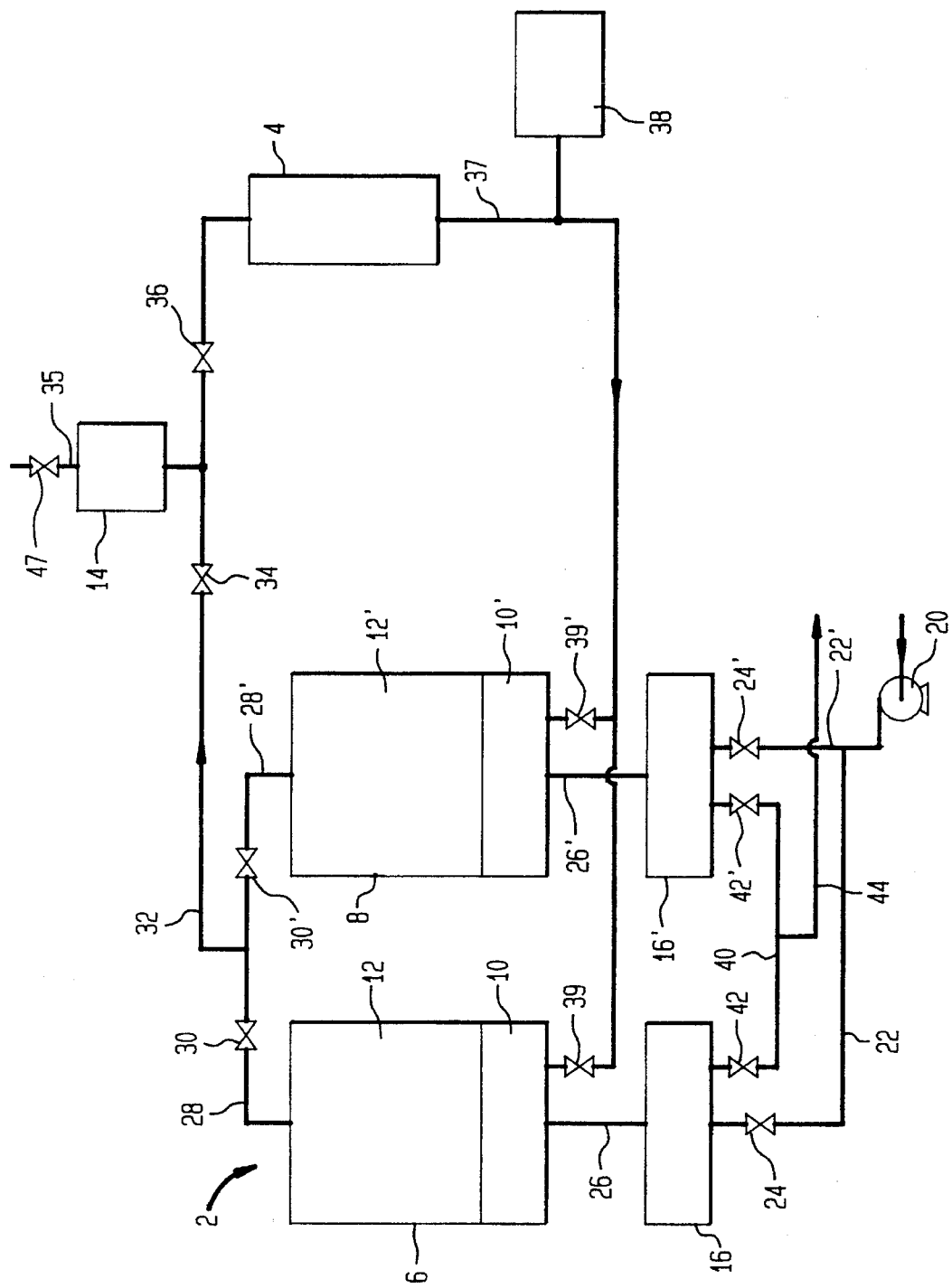

TREATING MATERIALS WITH OZONE

TECHNICAL FIELD

The present invention relates to a method of and apparatus for treating material such as a liquid with ozone.

BACKGROUND OF THE PRIOR ART

Ozone is an oxidizing agent which finds use in the treatment of, for example, water to produce a potable product.

It is known to produce ozone from an ozonizer using an oxygen rich feed gas which has been produced from a pressure swing adsorption (PSA) plant. Use of an oxygen rich gas produced by PSA techniques is very attractive for the generation of ozone in as much as it contains 8% of nitrogen and argon with substantially no water vapor which increases the efficiency of the ozone generator. When oxygen rich PSA gas is used as the feed gas for an ozonizer the maximum concentration of ozone that can be achieved is normally less than 10% but often the ozonizer is set to produce ozone at a concentration by volume of 5%.

Although, when compared to the use of air as a feed gas for the ozonizer, the ozonizer is decreased in size for the same output of ozone, the remainder of the oxygen rich gas which has not been converted to ozone is sometimes wasted, used in a different part of a subsequent process or needs to be cleaned up and returned to the process.

Japanese Published Patent Application 52081092 discloses a method of and apparatus for the production of ozone. Feed air is passed through a pressure vessel forming part of a PSA plant in which is located an adsorbent bed which preferentially adsorbs nitrogen. The oxygen rich gas leaving the pressure vessel is then delivered to an ozonizer where is undergoes silent discharge at a high voltage such that a portion of the oxygen is ozonized. The ozonized oxygen then leaves the ozonizer and is introduced into a separate low temperature ozone adsorber where the ozone is separated by being adsorbed while the oxygen leaves the ozone adsorber and can be recycled by means of a blower to blend with the oxygen leaving the pressure vessel before entry into the ozonizer.

The nitrogen generated in the pressure vessel is fed directly to the low temperature ozone adsorber where it desorbs the ozone and is discharged in the form of a ozone/nitrogen feed gas for passage to a material to be treated.

A disadvantage of the apparatus described in Japanese Published Patent Application 52081092 is that the recycled oxygen rich gas requires recompression before it can be used again. Further, the apparatus requires the provision of a separate low temperature ozone adsorber.

SUMMARY OF THE INVENTION

It is an aim of the present invention to provide an improved method of and apparatus for treating a material with ozone whereby oxygen gas mixed with ozone is recycled but does not require cleaning and is not passed through rotating machinery such as compressors or vacuum pumps.

According to one aspect of the present invention a method of treating a material with ozone comprises passing ozonized oxygen through a first bed of adsorbent material located in a vessel forming part of a PSA plant which preferentially adsorbs the ozone; passing the oxygen rich gas remaining through a second bed of adsorbent also located in the vessel for the production of oxygen together with feed air, the second bed preferentially adsorbing nitrogen during its adsorption step; desorbing the nitrogen from the second bed of adsorbent material during the regeneration step of the second bed and concomitantly desorbing the ozone from the first bed; and passing the ozone-nitrogen gas mixture to the material to be treated.

Preferably, oxygen produced by the PSA plant during the adsorption step of the second bed is utilized as the feed gas for an ozonizer for producing the ozonized oxygen.

Preferably the feed air prior to its passage through the second bed of adsorbent material is passed through a layer of dessicant.

In a preferred embodiment the pressure swing adsorption plant comprises at least two vessels each containing a first bed and a further bed, each vessel being subjected to a cycle including an adsorption step, an equalization step and a desorption step, the cycles being arranged 180° out-of-phase thereby to produce a substantially continuous supply of oxygen.

According to a further aspect of the present invention an apparatus for treating material with ozone comprises a PSA plant for the production of oxygen from compressed feed air, the PSA plant including a pressure vessel containing a bed of adsorbent material which preferentially adsorbs nitrogen and carbon dioxide relative to oxygen, means for the passage of the oxygen from the pressure vessel to an ozonizer for the production of ozonized oxygen, means for returning the ozonized oxygen to the pressure vessel which contains a further bed of adsorbent material which preferentially adsorbs the ozone, the oxygen remaining together with the compressed feed air passing through the bed of adsorbent material which preferentially adsorbs nitrogen and carbon dioxide relative to oxygen, and means for desorbing the pressure vessel such that a nitrogen-ozone gas mixture passes from the pressure vessel to the material to be treated.

BRIEF DESCRIPTION OF THE DRAWING

An embodiment of the invention will now be described, by way of example, reference being made to the Figure of the accompanying diagrammatic drawing which is a schematic flow diagram of an apparatus for treating a material with ozone.

DETAILED DESCRIPTION OF THE INVENTION

As shown, the apparatus comprises an oxygen PSA plant 2 for the production of an oxygen rich gas and an ozonizer 4. The PSA plant 2 is a two bed PSA plant comprising two substantially identical pressure vessels 6, 8 each containing a first bed 10, 10' of adsorbent, for example, silica gel, for the adsorption of ozone as will be explained and a second bed 12, 12' of adsorbent material which preferentially adsorbs nitrogen and carbon dioxide relative to oxygen.

As is well known in the art each bed 12, 12', in operation, passes through a cycle including an adsorption step, an equalization step and a regeneration step and the cycles of the two pressure vessels 6, 8 are arranged 180° out-of-phase to provide a continuous product gas rich in oxygen. Each pressure vessel 6, 8 has a line 28, 28' controlled by a valve 30, 30'. The lines 28, 28' communicated via a line 32 controlled by a valve 34 with a buffer vessel 14 containing a bed of carbon molecular sieve.

A line 35 control 1 ed by a valve 47 communicates at one end with the interior of the vessel 14 and at its opposite end with ambient atmosphere.

A further valve 36 is positioned between the vessel 14 and the ozonizer 4.

Associated with each pressure vessel 6, 8 is a vessel 16, 16' containing a dessicant, for example, alumina.

A compressor 20 is connected via a line 22 and valve 24 to the vessel 16 and via a line 22' and valve 24' to the vessel 16'. Each vessel 16, 16' is connected via a line 26, 26' respectively to its associated pressure vessel 6, 8. Extending between each vessel 16, 16' is a line 40 in which are located valves 42, 42' which line 40 connects with a line 44 communicating with an ozone contactor vessel (not shown).

The ozonizer 4 is connected by a line 37 and valve 39 to pressure vessel 6 and line 37 and valve 39' to pressure vessel 8. A buffer vessel 38 communicates with line 37.

When in use and assuming the bed 12 of adsorbent in the pressure vessel 6 is undergoing its adsorption step, the compressor 20 compresses feed air and supplies the feed air under pressure via line 22 and open valve 24 through the vessel 16, where it is dried such that dry feed air passes into the pressure vessel 6. The bed 12 of adsorbent material selectively adsorbs nitrogen and carbon dioxide such that an oxygen rich product gas leaves the pressure vessel 6 via line 28 and open valve 30. The oxygen rich product gas passes through line 28, valve 30 and into line 32, open valve 34 and hence into the buffer vessel 14 which is filled with carbon molecular sieve. The oxygen is largely adsorbed by the carbon molecular sieve and the interstitial spaces between the carbon molecular sieve is filled with an argon enriched gas. From the buffer vessel 14 the oxygen passes through the open valve 36 to the ozonizer 4.

In the ozonizer 4 ozone is formed by means of a silent electrical discharge in a manner known per se. Ozonized oxygen is then passed to a second buffer vessel 38 via the line 37. The ozonized oxygen then passes from the buffer vessel 38 through open valve 39' into the pressure vessel 8 at the point in its cycle when the bed 12' has been regenerated and after the equalization step with the bed 12 of pressure vessel 6. Pressure equalization is effected by shutting valve 24 such that feed air no longer enters the pressure vessel 6 and opening valves 30, 30' so that gas under pressure leaves pressure vessel 6 via line 28 and passes through the valves 30, 30' into line 28' and hence into pressure vessel 8.

The oxygen in the ozonized oxygen on entering the pressure vessel 8 passes through the adsorbent 10' to the bed 12' whereas the ozone is adsorbed in the bed 10'. Feed air is now diverted through open valve 24' to vessel 16' and line 26' such that the bed 12' contained within the pressure vessel 8 is now on its adsorption step.

When the bed 12' in pressure vessel 8 reaches its regeneration step, nitrogen rich gas is desorbed from the bed 12' as is the ozone from the bed 10' and the nitrogen-ozone mixture passes through the vessel 16' via valve 42' and lines 40, 44 towards the ozone contactor vessel for treating waste water, for example, in a manner known per *se.

The buffer vessel 14 filled with carbon molecular sieve acts as a means of balancing any argon build-up in the system and a small amount of gas is released via valve 47 from time to time to maintain the product compression that is suitable for the ozonizer 4.

Although the vessels 16, 16' containing the dessicant are shown spaced from their respective pressure vessels 6, 8 they could be contained within the pressure vessels 6, 8.

The ozone contained in the 'nitrogen-ozone stream' is now at a concentration of about 0.2% by volume. This is advantageous in many instances reducing hazards and dissociation of the ozone. If the ozone is going to be used in a water system it can be readily stripped from the mixture in a tower as the solubility ratio with nitrogen is twice as high as it is with oxygen.

In the above described embodiment the ozone/oxygen mixture is dry and is not passed into the alumina layers contained within vessels 16, 16'. However, if for simplicity, the vessels 16, 16' were built to contain a layer of silica gel then the dryness of the oxygen/ozone mixture would ensure that most of the ozone remained trapped on the silica gel.

In a modification the ozone could be desorbed from the beds 10, 10' without passing through the dessicant layers in the vessels 16, 16'. However, a portion of the nitrogen would be needed to regenerate the dessicant. In this event an activated ozone destructor would be placed in the vent line.

From the forgoing, it will be appreciated that, although specific embodiments of the invention have been described herein for purposes of illustration, various modification may be made without deviating from the spirit and scope of the invention. Accordingly, the invention is not to be limited except as by the appended claims.

We claim:

1. A method of treating a material with ozone comprising:
   (a) passing ozonized oxygen through a first bed of adsorbent material located in a vessel forming part of a pressure swing adsorption plant, thereby preferentially adsorbing ozone and producing a non-adsorbed oxygen-rich gas;
   (b) passing said nonadsorbed oxygen-rich gas and air through a second bed of adsorbent, thereby adsorbing nitrogen from said air and producing an oxygen-rich product stream;
   (c) desorbing nitrogen from said second bed of adsorbent and ozone from said first bed of adsorbent;
   (d) combining the desorbed nitrogen and desorbed ozone from step (c); and
   (e) contacting the combined ozone-nitrogen gas with said material.

2. A method as claimed in claim 1 in which oxygen produced in the pressure-swing adsorption plant during the adsorption step of the second bed is utilized as the feed gas for an ozonizer for producing the ozonized oxygen.

3. A method as claimed in claim 1, in which the feed air prior to its passage through the second bed of adsorbent material is passed through a layer of dessicant.

4. A method as claimed in claim 1, in which the pressure swing adsorption plant comprises at least two beds operated out-of-phase, thereby producing a substantially continuous supply of oxygen.

5. A method as claimed in of claim 1, in which at least some ozone-nitrogen gas mixture passes through a layer of dessicant prior to its passage to the material to be treated.

* * * * *